United States Patent [19]

Kim

[11] Patent Number: 5,359,484
[45] Date of Patent: * Oct. 25, 1994

[54] CIRCUIT FOR GENERATING A DISK CHANGE SIGNAL

[75] Inventor: Jik Kim, Suweon, Rep. of Korea

[73] Assignee: SamSung Electronics Co., Ltd., Suwon, Rep. of Korea

[*] Notice: The portion of the term of this patent subsequent to Jan. 11, 2011 has been disclaimed.

[21] Appl. No.: 827,751

[22] Filed: Jan. 29, 1992

Related U.S. Application Data

[63] Continuation-in-part of Ser. No. 755,555, Sep. 5, 1991, Pat. No. 5,278,718.

[30] Foreign Application Priority Data

May 24, 1991 [KR] Rep. of Korea ................. 8451/1991

[51] Int. Cl.$^5$ ............................................. G11B 33/10
[52] U.S. Cl. ...................................... 360/137; 360/71
[58] Field of Search ....... 360/137, 73.03, 99.01–99.04, 360/71

[56] References Cited

U.S. PATENT DOCUMENTS 4,809,119  2/1989  Tsuyuguchi et al. ............ 360/73.03

*Primary Examiner*—John H. Wolff
*Assistant Examiner*—Craig A. Renner
*Attorney, Agent, or Firm*—Robert E. Bushnell

[57] ABSTRACT

A disc change signal generating circuit which uses an index sensor for generating an index pulse in order to detect a rotation of a floppy disk, a timer to input the output of the index sensor into a clear terminal and to input a clock signal into a clock terminal and thereby generate a value with a predetermined frequency, and a disk change signal generating circuit for generating a disk change signal by input of the output of the timer.

20 Claims, 3 Drawing Sheets

CIRCUIT FOR GENERATING A DISK CHANGE SIGNAL

CROSS-REFERENCE TO RELATED APPLICATIONS

This application makes reference to and claims the benefits available under 35 U.S.C. §§119 and 120, of co-pendency with an application entitled Circuit For Generating A Disk Change Signal, filed in the U.S. Patent and Trademark Office on Sep. 5, 1991 and assigned Ser. No. 07/755,555. This application is a continuation-in-part of U.S. patent application Ser. No. 07/755,555, filed Sep. 5, 1991, now U.S. Pat. No. 5,278,718, issued Jan. 11, 1994.

BACKGROUND OF THE INVENTION

The present invention relates to a floppy disk driving apparatus, particularly to a circuit which generates a disk change signal for detecting existence of a floppy disk inserted thereto.

A known conventional floppy disk driving apparatus has an index sensor which detects the rotation of the floppy disk and a disk-in sensor which detects the insertion state of the floppy disk. FIGS. 1B and 1A show schematic diagrams of the index sensor and disk-in sensor, respectively, of a conventional floppy disk driving apparatus.

Referring to FIG. 1A, when a floppy disk is inserted into a floppy disk driving apparatus, light-receiving transistor PQ1 is turned off, thereby cutting off light emitted from the light emitting diode $PD_1$ of the disk-in sensor S1. If light-receiving transistor PQ1 is turned off, a logic signal of line 1 becomes a high level signal and then the high level signal is applied to the clear terminal of flip-flop $FF_1$.

A disk change reset signal is applied from a controller (not shown) to the clock terminal CL of the flip-flop $FF_1$, whereby flip-flop $FF_1$ outputs the logic "high level signal" through the output terminal Q of the flip-flop $FF_1$, thus enabling the controller to detect the insertion state of the floppy disk. By detecting the logic high level on the disk change signal line, the controller determines that the disk has been changed and thereby can operate the floppy disk driving apparatus under a normal condition.

When the floppy disk is extracted from the floppy disk driving apparatus, the disk-in sensor S1 is activated and a logic "low level signal" is output through line 1, thereby the output signal of a logic "low level signal" is applied to the clear terminal CLR of the flip-flop $FF_1$ and then the flip-flop is cleared. A logic "low level signal" is then output through the output terminal Q of the flip-flop $FF_1$. When the disk change signal from the output terminal Q of the flip-flop $FF_1$ becomes a logic "low level signal", the controller detects an extraction of the floppy disk.

Referring to Fig. 1B which is a circuit for detecting a rotation of the floppy disk, an index sensor S2 is activated by the rotation of the floppy disk, whereby an index sensing circuit 10 detects an index pulse. Conventional floppy disk driving apparatus as shown in FIGS. 1A and 1B comprises both the disk-in sensor and the index sensor; consequently, the design of a conventional floppy disk driving apparatus is complex and material cost of the apparatus is high.

SUMMARY OF THE INVENTION

An object of the present invention is to provide a disk change signal generating circuit in which the disk change signal is generated by using an index sensor.

Another object of the present invention is to provide a disk change signal generating circuit which uses an index sensor instead of a disk-in sensor, with the index sensor integrated into a large-scale integrated circuit (i.e., a LSI).

According to the present invention, the inventive circuit can be practiced with LSI and can simplify the design and structure of the apparatus.

DETAILED DESCRIPTION OF THE PREFERRED EMBODIMENT

Figure 1A:
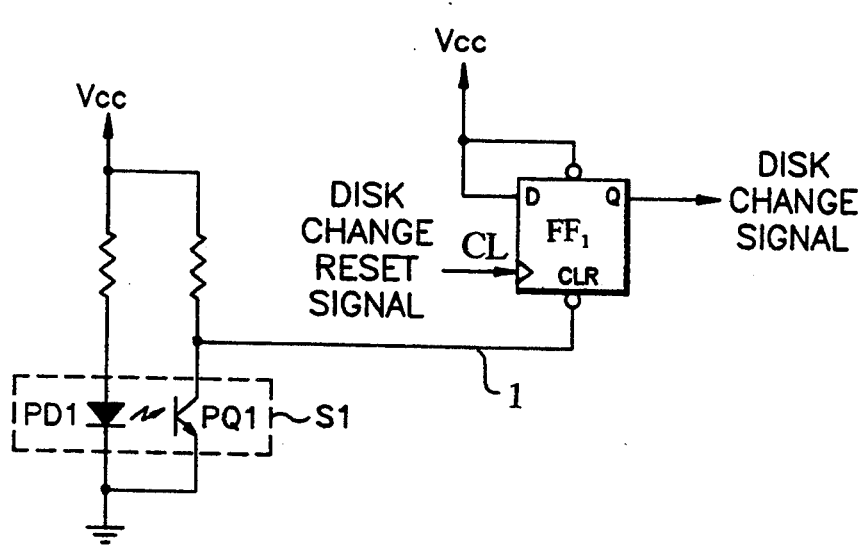
FIG. 1A shows a conventional circuit diagram for generating disk change signals.
Figure 1B:
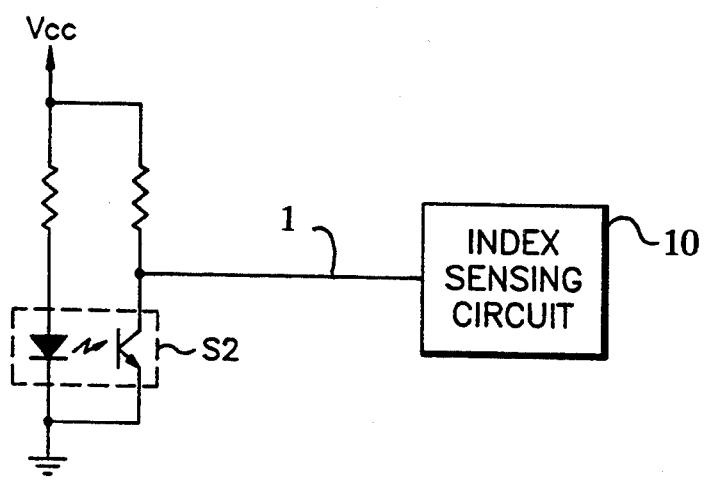
FIG. 1B shows a conventional circuit diagram for detecting rotation of the floppy disk.
Figure 2:
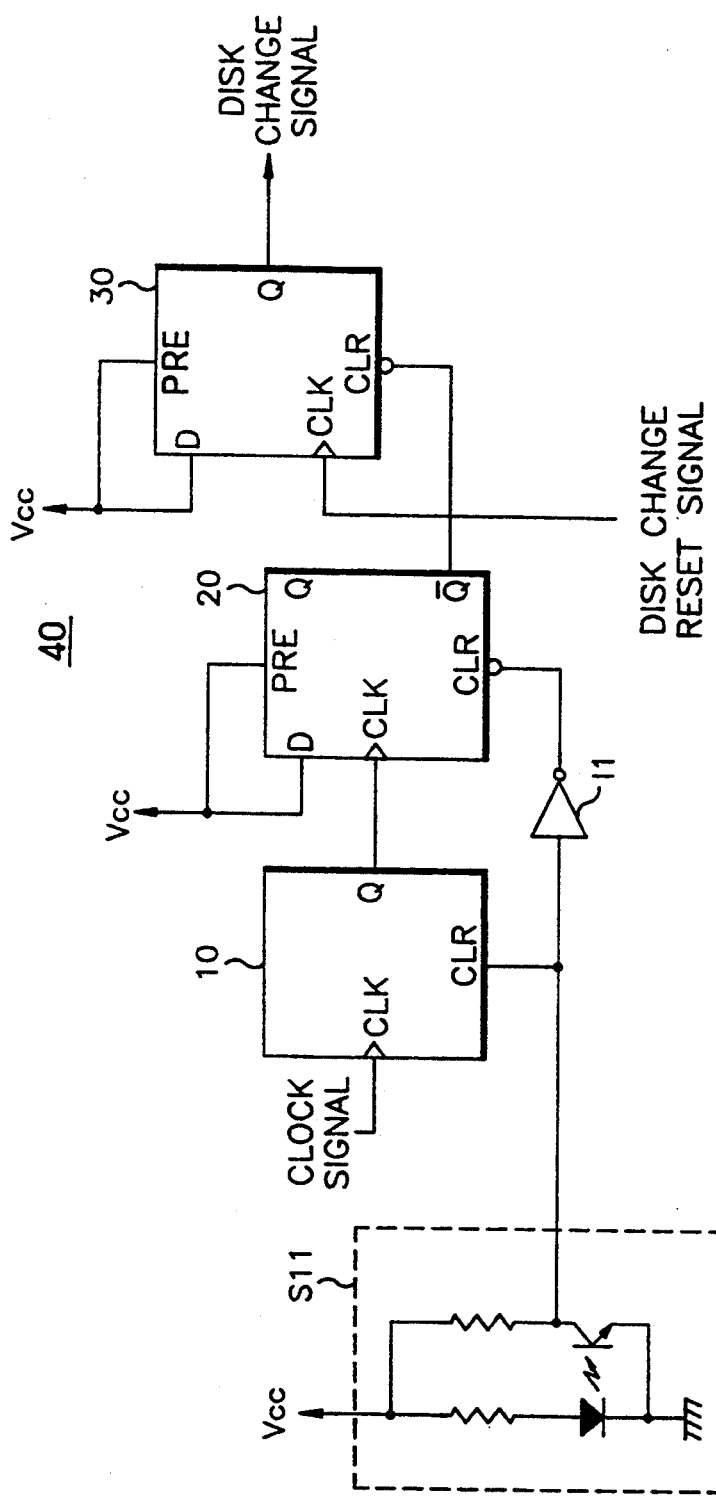
FIG. 2 shows a disk change signal generating circuit according to the present invention.

Referring now to FIG. 2, the circuit 40 comprises an index sensor $S_{11}$, a timer 10, and two D-type flip-flops 20 and 30. The index sensor $S_{11}$ generates an index pulse as the disk rotates once. The timer 10 receives the index pulse output signal of the index sensor $S_{11}$ through the clear terminal CLR and predetermined-frequency clock signals through the clock terminal CLK. The clock terminal CLK of the flip-flop 20 is connected to the output terminal Q of the timer 10 and the clear terminal CLR of the flip-flop is coupled to receive the index pulse output signal of the index sensor $S_{11}$ through the inverter $I_1$. The output signal from the output terminal $\overline{Q}$ of the flip-flop 20, which is applied to the clear terminal CLR of the flip-flop 30, is indicative of whether or not a disk has been inserted (i.e., the disk insertion state). The flip-flop 30 generates the disk change signal by receiving the disk reset signal through its clock terminal CLK and the signal which represents the disk insertion state through the clear terminal CLR. The disk change reset signal is automatically generated by the control systems of appliances such as personal computers, etc.

Figure 3:
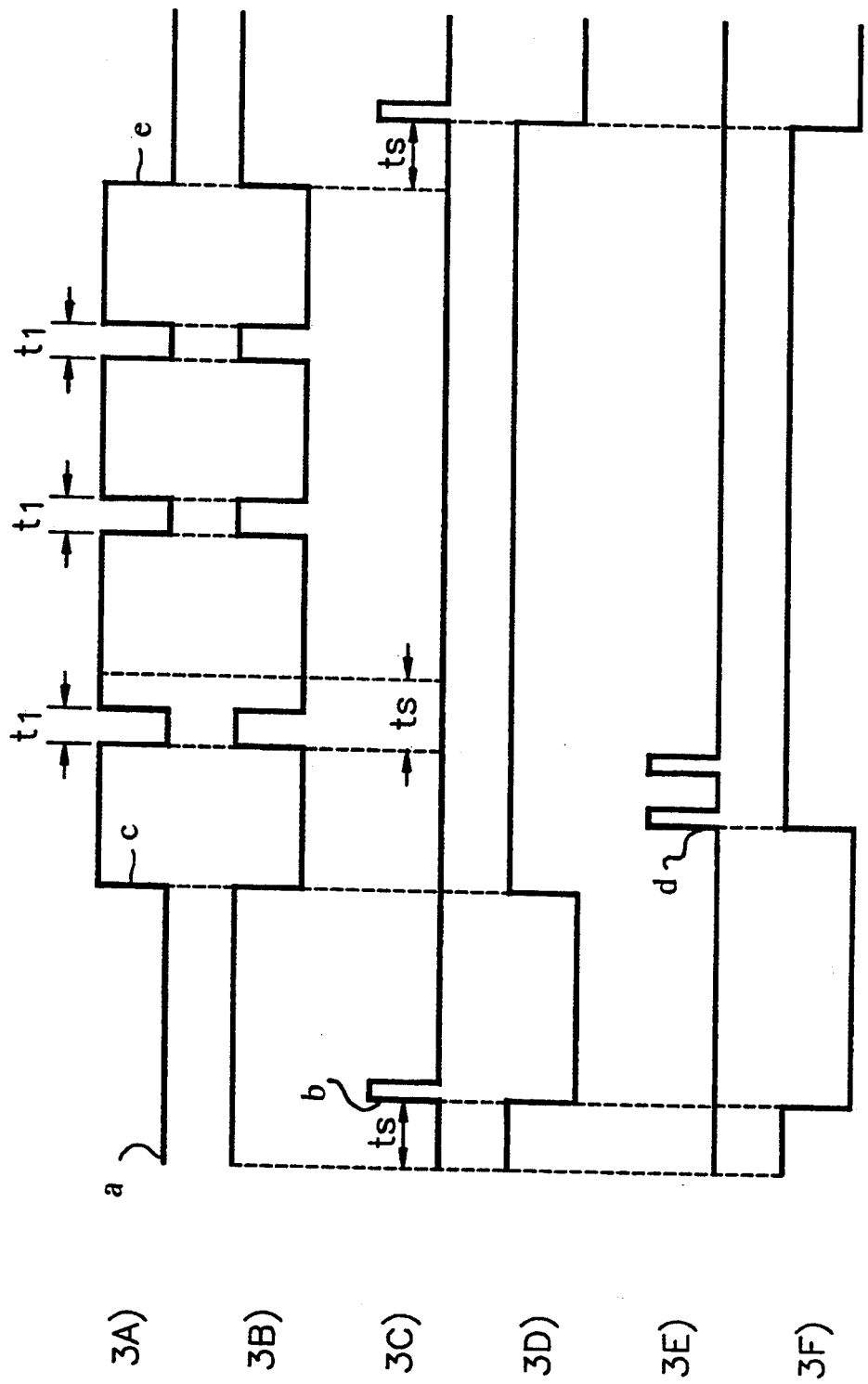
FIG. 3 shows an operational timing diagram for the circuit of FIG. 2.

FIG. 3 shows the operational timing diagram of FIG. 2 according to the present invention.

Initially, at time "a", the index sensor $S_{11}$ continuously outputs a logic "low level signal" before the time "a" as shown in waveform 3A; the time before "a" represents the period before insertion of the disk into the floppy disk driving apparatus. By receiving the logic "low level signal" through the clear terminal CLR, the timer 10 starts the counting operation. When the established time "$t_s$" of the timer 10 has passed, timer 10 generates at least one output pulse at its output terminal Q at time "b", as is shown in waveform 3C. Initially, at time "a" the logic "low level signal" from index sensor $S_{11}$ is inverted by inverter $I_1$, as is shown by waveform 3B, and is applied to the clear terminal CLR of flip-flop 20, whereby flip-flop 20 releases its clear state. Therefore, the flip-flop 20 is enabled to receive the low-to-high transition from timer 10 through the clock terminal CLK at time "b", and to change, in response, the output of the inverse output terminal $\overline{Q}$ to a logic low level as is shown in waveform 3D. The logic low level signal from the inverse output terminal $\overline{Q}$ of flip-flop 20 is applied to the clear terminal CLR of flip-flop 30, whereby flip-flop 30 finally generates disk change signal of logic low level to output terminal Q, as is shown in waveform 3F, so as to indicate the absence of a disk within the floppy disk driving apparatus, independently of the disk change reset signal shown in waveform 3E.

When a disk is inserted into the floppy disk driving apparatus at the time "c", index sensor $S_{11}$ outputs a logic "high level signal", and this high level signal clears timer 10 while the low logic level signal from inverter $I_1$ clears flip-flop 20. The high level signal from the inverse output terminal $\overline{Q}$ of flip-flop 20 is applied to the clear terminal CLR of flip-flop 30, whereby flip-flop 30 changes output Q of flip-flop 30 to a logic high level in response to the disk change reset signal received through the clock terminal CLK at time "d", and outputs the high level disk change signal to the controller (not shown) so as to indicate the presence of a disk within the floppy disk driving apparatus.

When a disk is inserted into the floppy disk driving apparatus and the disk starts to rotate, index sensor $S_{11}$ generates an index pulse each time that index sensor $S_{11}$ detects an index hole of the disk. Each of the index pulses has a pulse width of $t_1$ as is shown in waveform 3A. Flip-flop 20 can release its clear state during the time of $t_1$ because $t_1 < t_s$, so that the inverse output signal of flip-flop 20 at its terminal $\overline{Q}$ has no change. Therefore, the disk change signal from the flip-flop 30 still remains in a high level state without any change. If the disk is extracted from the floppy disk driving apparatus at the time of "e", the output signal of the index sensor $S_{11}$ immediately goes to logic low level as shown in waveform 3A. After the established time $t_s$ of the timer 10 has passed, the disk change signal from terminal Q of flip-flop 30 is changed to logic low level according to the procedures described above.

As described above, the inventive circuit provides a new method of making the disk change signal by detecting the insertion state of the floppy disk through the use of an index sensor. The circuit provided can be easily integrated into the inside of a large scale integrated device, and a separate disk-in sensor can thereby be omitted in the inventive circuit, thus enabling a designer to simplify the structure of the floppy disk driving apparatus. Consequently, the designer can reduce the material cost of the floppy disk driving apparatus.

The present invention is not limited to the above embodiments, and various other changes and modifications may be made within the spirit and scope of the invention recited in the appended claims.

What is claimed is:

1. A circuit for generating a disk change signal for a disk driver, comprising:
   index sensing means for generating an index pulse signal upon detection of rotation of a floppy disk, said index sensing means comprising means for emitting light and means for receiving said light;
   timer means connected to receive said index pulse signal into a clear input terminal and to receive a clock signal into a clock input terminal, for generating a timing signal at a predetermined time; and
   output means connected to receive said timing signal, an inverted index pulse signal and a disk change reset signal, for generating said disk change signal, said output means comprising flip-flop means.

2. The circuit according to claim 1, wherein said flip-flop means comprises:
   a first flip-flop connected to receive said inverted index pulse signal into a clear input terminal of said first flip-flop and to receive said timing signal into a clock input terminal of said first flip-flop, for producing a control signal to determine presence of said floppy disk inserted into the disk driver; and
   a second flip-flop connected to receive said control signal into a clear input terminal of said second flip-flop and to receive said disk change reset signal into a clock input terminal of said second flip-flop, for producing said disk change signal.

3. The circuit according to claim 2, wherein said first and second flip-flops are comprised of D-type flip-flops.

4. The circuit according to claim 2, further comprising inverting means coupled between said index sensing means and said output means, for providing said inverted index pulse signal to the clear input terminal of said first flip-flop.

5. The circuit according to claim 3, further comprising inverting means coupled between said index sensing means and said output means, for providing said inverted index pulse signal to the clear input terminal of said first flip-flop.

6. The circuit according to claim 1, further comprised of said index pulse signal having a pulse length shorter in duration than said predetermined time.

7. The circuit according to claim 2, further comprised of said index pulse signal having a pulse length shorter in duration than said predetermined time.

8. A circuit for generating a disk change signal in a disk driver, comprising:
   index sensing means comprising means for emitting light and means separable by a floppy disk from said light emitting means, for receiving said light, said index sensing means for generating a sensing signal continuously exhibiting a first logical value during an absence of said floppy disk and for generating said sensing signal exhibiting an index pulse indicative of each rotation of the floppy disk;
   timing means for generating a timing signal upon continuation of exhibition of said first logical value by said index sensing means for a period of time; and
   output means for generating said disk change signal indicative of said absence of the floppy disk in response to said timing signal, said sensing signal, and in response to a disk change reset signal.

9. The circuit according to claim 8, wherein said output means comprises:
   first flip-flop means connected to receive said sensing signal at a clear input terminal of said first flip-flop means and to receive said timing signal at a clock input terminal of said first flip-flop means, for producing a control signal to indicate presence of said floppy disk inserted into said disk driver in response to said sensing signal and said timing signal; and
   second flip-flop means connected to receive said control signal at a clear input terminal of said second flip-flop means and to receive said disk change reset signal at a clock input terminal of said second flip-flop means, for producing said disk change signal in response to said control signal and said disk change reset signal.

10. The circuit according to claim 9, wherein said first and second flip-flop means are comprised of D-type flip-flops.

11. The circuit according to claim 9, further comprising inverting means coupled between said index sensing means and said output means, for providing an inverted signal of said sensing signal to the clear input terminal of said first flip-flop means.

12. The circuit according to claim 10, further comprising inverting means coupled between said index sensing means and said output means, for providing an inverted signal of said sensing signal to the clear input terminal of said first flip-flop means.

13. The circuit according to claim 8, further comprised of said index pulse having a pulse length shorter in duration than said period of time.

14. The circuit according to claim 8, further comprised of said index pulse of said sensing signal exhibiting said first logical value over a pulse length shorter in duration than said period of time.

15. The circuit according to claim 9, further comprised of said index pulse having a pulse length shorter in duration than said period of time.

16. The circuit according to claim 9, further comprised of said index pulse exhibiting said first logical value over a pulse length shorter in duration than said period of time.

17. A process for generating a disk change signal in a disk driver, comprising:

generating a sensing signal continuously exhibiting a first logical value during an absence of a floppy disk;

generating said sensing signal to exhibit an index pulse indicative of each rotation of the floppy disk during a presence of said floppy disk in said disk driver;

generating a timing signal in dependence upon continuation of said first logical value for a period of time; and generating said disk change signal to indicate said absence of the floppy disk in response to said timing signal, said sensing signal and in response to a reset signal.

18. The process of claim 17, further comprised of said index pulse having a pulse length less than said period of time.

19. A circuit for generating a disk change signal for a disk driver, comprising:

index sensing means for generating an index pulse signal upon detection of rotation of a floppy disk, said index sensing means comprising means for emitting light and means for receiving said light;

timer means connected to receive said index pulse signal into a clear input terminal and to receive a clock signal into a clock input terminal, for generating a timing signal at a predetermined time;

a first flip-flop connected to receive an inverted index pulse signal into a clear input terminal of said first flip-flop and to receive said timing signal into a clock input terminal of said first flip-flop, for producing a control signal to determine presence of said floppy disk inserted into the disk driver; and a second flip-flop connected to receive said control signal into a clear input terminal of said second flip-flop and to receive a disk change reset signal into a clock input terminal of said second flip-flop, for producing said disk change signal.

20. The circuit according to claim 19, further comprising inverting means coupled between said index sensing means and said first flip-flop, for providing said inverted index pulse signal to the clear input terminal of said first flip-flop.

* * * * *